United States Patent [19]
Giokas et al.

[11] Patent Number: 5,313,581
[45] Date of Patent: May 17, 1994

[54] SYSTEM AND METHOD FOR COMMUNICATION BETWEEN WINDOWING ENVIRONMENTS

[75] Inventors: Dennis G. Giokas, Nashua, N.H.; Andrew T. Leskowitz, Leominster, Mass.

[73] Assignee: Digital Equipment Corporation, Maynard, Mass.

[21] Appl. No.: 128,031

[22] Filed: Sep. 28, 1993

Related U.S. Application Data

[63] Continuation of Ser. No. 582,077, Sep. 14, 1990.

[51] Int. Cl.$^5$ ............................................... G06F 3/00
[52] U.S. Cl. ..................................... 395/200; 395/500
[58] Field of Search ............... 395/200, 500, 157, 650, 395/700; 340/706

[56] References Cited

U.S. PATENT DOCUMENTS

| | | | |
|---|---|---|---|
| 4,458,311 | 7/1984 | Clements et al. | 395/144 |
| 4,550,386 | 10/1985 | Hirosawa et al. | 395/275 |
| 4,723,210 | 2/1988 | Barker et al. | 395/147 |
| 4,761,642 | 8/1988 | Huntzinger | 340/721 |
| 4,823,108 | 4/1989 | Pope | 340/721 |
| 4,829,294 | 5/1989 | Iwami et al. | 340/723 |
| 4,845,644 | 7/1989 | Anthias et al. | 395/157 |
| 4,859,995 | 8/1989 | Hansen et al. | 340/710 |
| 4,899,136 | 2/1990 | Beard et al. | 340/706 |
| 4,989,139 | 1/1991 | Friedman et al. | 395/200 |
| 5,113,517 | 5/1992 | Beard et al. | 395/500 |
| 5,133,053 | 7/1992 | Johnson et al. | 395/200 |
| 5,142,622 | 8/1992 | Owens | 395/200 |

OTHER PUBLICATIONS

G. Widener, "The X11 Inter-Client Communication Conventions Manual", pp. 111 and 113, Software Practice & Experience, vol. 20, No. S2, 20 Oct. 1990, Chichester GB, pp. 109-118.

R. W. Scheifler and J. Gettys, "The X Window system", pp. 84, 86, 98 and 99, ACM Transactions on Graphics, vol. 5, No. 2, Apr. 1986, pp. 79-109.

"Inter-program graphical data distribution", IBM Technical Disclosure Bulletin, vol. 31, No. 10, Mar. 1989, New York, US.

XVision product brochure dated Dec. 1989, VisionWare Limited Document Number 0080194.

*Primary Examiner*—Dale M. Shaw
*Assistant Examiner*—D. Dinh
*Attorney, Agent, or Firm*—Kenneth F. Kozik; A. Sidney Johnston; Albert P. Cefalo

[57] ABSTRACT

A communication client is connected to multiple display servers. When a client of one of the display servers issues a communication, the communication client notes the communication in the display server coupled to the client and relays the communication to the other servers for use by clients of the other servers.

38 Claims, 9 Drawing Sheets

SYSTEM AND METHOD FOR COMMUNICATION BETWEEN WINDOWING ENVIRONMENTS

This application is a continuation of application Ser. No. 07/582,077, filed Sep. 14, 1990.

BACKGROUND OF THE INVENTION

This invention relates generally to systems that provide graphics environments for application programs, and more particularly to communication between application programs in systems capable of running multiple application programs written for various environments.

In modern data processing, protocols define the data formats and order of communication that allow application programs to communicate with system components such as I/O devices or servers. These protocols include application programming interfaces, interprocess communication protocols, and remote procedure calls. With the rapid growth of computers and application programs, there has been a parallel growth in the number of software and hardware protocols. The existence of multiple protocols throughout the data processing industry has been a source of inconvenience because application programs written for one protocol must be modified, rewritten, or even redesigned, for a different protocol.

The problem of multiple protocols is particularly acute in the graphics area where there are a number of standards in use. Certain graphics systems use a software package called a display server to implement a graphics protocol. In such systems, application programs requesting graphics services, called clients, send their graphics requests to the display server.

The graphic services can include an interclient communication facility. As discussed in greater detail below, interclient communication may be required when, for example, a user copies text from a window "owned" by one client into a window owned by a different client. Windows are areas on a video screen that allow a user to view data processing output. Windows provide clients an organized way of managing the use of space on the screen, and allow the display server to present information for multiple clients in an organized way.

It is often desirable for different display servers, each with their own set of clients, to run on the same system. If this is done, there is often a need for clients connected to one server to communicate with clients connected to the other server. For example, a user may wish to copy data from a window generated by one server into a window generated by another server.

FIG. 1 is a diagram of a system disclosed in U.S. Pat. No. 4,899,136 having a server implemented by a host system processor and another server implemented by an emulating processor. When a user copies data from a window generated by the host system processor into a window generated by the emulating processor, the host processor seizes control of the keyboard buffer for the emulating processor and writes the data into the buffer by simulating key strokes.

One problem with this method of communication is that in order to transfer data in this manner, the host system processor must have access to low-level data structures of the emulating processor, such as keyboard buffers. Writing a system having this architecture is inconvenient.

Converting an existing single server system into such a system, may also entail substantial legal and technological problems. For example, the person attempting to implement such a system might not possess the legal right to modify the support technology used by an existing single server system, as that technology may be protected by the intellectual property rights of another. Also, the support technology of the single server system may be poorly documented or structured in such a way as to make it difficult or impossible to adapt to support another server. Therefore, it is desirable not to have to modify existing host systems.

Further, the '136 patent's method of data transfer is limited to types of data that are represented by key strokes, and may therefore not be suitable for the bidirectional transfer of other data, such as bit-map data. Also, the '136 patent only provides for the transfer of bit-map data from an emulating processor window into a host system processor window, but not for the transfer of data from a host system processor window into an emulating processor window.

An example of a single server graphics system having a communication facility common to a number of clients is one defined by the X Window System protocol, a standard developed at the Massachusetts Institute of Technology. FIG. 2 shows an X Window system, where clients 210, 220, and 230 send graphics request to a display server for implementing the X Window System Protocol (X server) 240, thereby communicating with graphics hardware 250.

Basic principles and architecture of the X Window System may be found in "Introduction to the X Window System" by Oliver Jones, Prentice-Hall 1989. The protocol for communicating with an X Window display server is described in "X Window System Protocol MIT X Consortium Standard X Version 11," Release 4, by Robert W. Scheifler, MIT Laboratory for Computer Science. Conventions for communication between clients are described in "Inter-Client Communication Conventions Manual, Version 1.0, MIT X Consortium Standard," by David S. H. Rosenthal, Sun Microsystems, Inc.

X Window Systems are not the only graphics systems in use throughout the industry. Therefore, it may be desirable to execute clients written for an X Window System together with clients written for some other type of windowing system. An example of another windowing system currently in use is the Microsoft Operating System/2 Presentation Manager (PM). It is therefore likely that a need will arise to execute clients using the X Window System protocol (X clients) in the same system as clients using the PM system protocol (PM clients).

When using the two different types of clients in a single system as described above, it is desirable to allow X clients connected to the X server to communicate with PM clients connected to the PM display server (PM server), thereby allowing the user to transfer text or other data from a window owned by an X client into a window owned by a PM client.

Further, it is desirable that an X client be able to communicate with PM clients in the same manner as the X client communicates with other X clients, while allowing a PM client to communicate with X clients in the same manner as the PM client communicates with other PM clients.

SUMMARY OF THE INVENTION

It is an advantage of this invention to allow clients connected to one server to communicate with clients connected to a different server without requiring integration between low level data structures of the two servers.

It is a further advantage of this invention to allow communication of data other than text.

It is still a further advantage of this invention to allow protocol independent interclient communication between clients written with the various protocols.

Briefly, this invention detects a communication directed to the communication facility of one server by a client connected to the server and makes the communication available to clients connected to a different server. This allows a user to copy data from a window owned by a client of one server and paste the data into a window owned by a client of a different server.

To achieve these and other advantages, according to one aspect of the present invention, in a computer system having a first server with a first communications facility for providing communication between clients of the first server, and a second server with a second communication facility for providing communication between clients of the second server, a method of communicating between a first one of the clients of the first server and a second one of the clients of the second server comprising the steps, performed by a communication client of both the first and second servers, of receiving, by the communication client, a first communication transmitted by the first client to the first communication facility of the first server; sending, to the second communication facility of the second server, a notification for the second client of the first communication from the first client.

According to another aspect of the present invention, a computer system for providing communication mechanisms to clients comprises a first server processor for responding to communication operations requests generated by a first one of the clients of the first server processor, the first server processor including a first communication facility for communicating between client of the first server; a second server processor for responding to the communication operations requests generated by a second one of the clients of the second server processor, the second server processor including a second communication facility for communication between clients of the second server; and a communication client, coupled to the first server processor as a client and to the second server processor as a client, including means for receiving a first communication transmitted by the first client to the first communication facility of the first server; and means, coupled to the receiving means, for sending to the second communication facility of the second server a notification for the second client of the first communication from the first client.

The accompanying drawings, which are incorporated in and which constitute a part of this specification, illustrate preferred embodiments of the invention and, together with the description, explain the principles of the invention.

DESCRIPTION OF THE PREFERRED EMBODIMENTS

Figure 1:
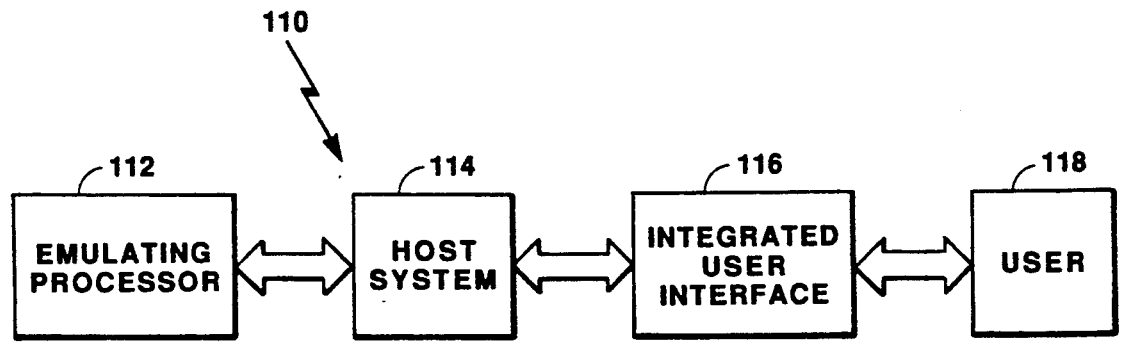
FIG. 1 is a block diagram of one type of multi-server system in which a host system processor has access to low level data structures of another processor.
Figure 2:
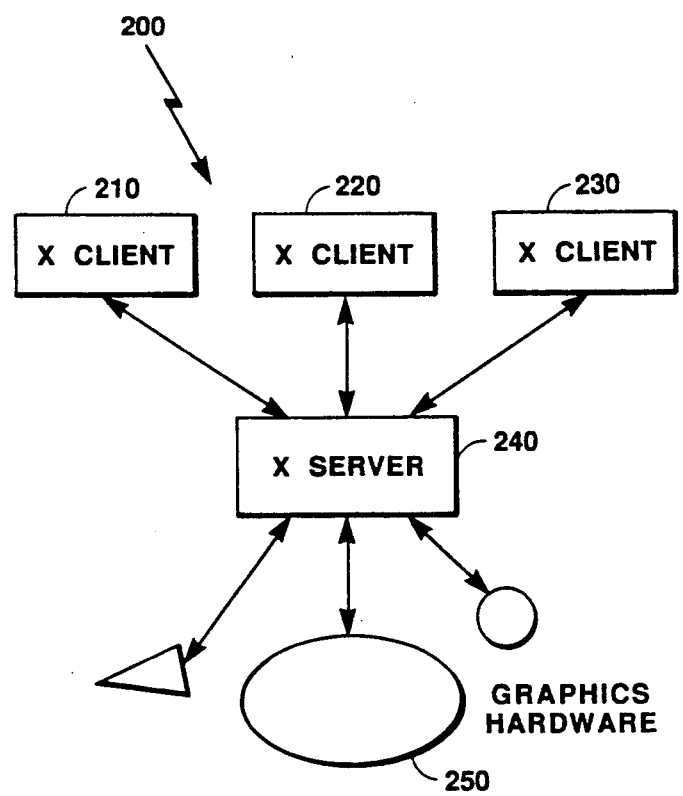
FIG. 2 is a block diagram of a prior art single-server system.

Reference will now be made in detail to presently preferred embodiments of the invention, examples of which are illustrated in the accompanying drawings.

The presently preferred embodiments of the invention allow clients executing one protocol to communicate with clients executing another protocol. In the embodiments shown in the drawings, one of the protocols is the X window system protocol described in the BACKGROUND OF THE INVENTION.

The X window server provides token-like mechanisms called "selections" that allow communication between X clients. Each selection has a unique selection name and may be controlled by one X client at a time. The client controlling the selection is the current "owner" of the selection. The controller of a selection controls what data is associated with the selection at a given time. An X client other than the controller may request information about the data associated with the selection, and the controller of the selection should then respond to the request from the requesting X client. Thus, the controller of the selection may be viewed as the transmitter of data and the requester may be viewed as the receiver of data.

X clients send "requests" to the X server to perform graphics functions. A request is a type of message. For example, a SetSelectionOwner request asks that the X client sending the request become the controller of the selection designated in the request. Another example is the CreateWindow request, which asks that a new window be created by the server and that the X client issuing the request be made the owner of the window.

The X Window server, in turn, generates "events" to inform clients of status information. For example, the SelectionClear event indicates that a certain client has lost control of a certain selection. When the SelectionClear event is generated for a window associated with a selection, it is sent to clients that have designated SelectionClear as one of the events they wish to receive for that window. This is done by setting an appropriate bit in an event mask for that window.

In the X Window system, it is a convention that X clients copying data from a window assert control of a selection named the "CLIPBOARD" and internally associate the copied data with the CLIPBOARD selection. X clients copying data into a window should copy from the data currently associated with the CLIPBOARD selection. Copying data currently associated with the CLIPBOARD selection may involve requesting the contents of the selection from the current controller of the selection if the X client copying data into a window is not the current controller. This is described in detail in the inter-client communication conventions manual cited above.

In the embodiments shown in the drawings, the other protocol is one implemented by the Presentation Manager (PM) of the Microsoft Operating System/2. PM has an internal inter-client communication facility also called the "CLIPBOARD." The PM CLIPBOARD is different than the X Window CLIPBOARD selection, however. The PM CLIPBOARD is a database that PM clients may write or read. In the PM system, it is a convention that PM clients copying data from a window write the data to the PM CLIPBOARD, and that PM clients copying data into a window read the data from the PM CLIPBOARD.

The three preferred embodiments of the invention described below keep the contents of the PM CLIPBOARD consistent with the contents of the X Window CLIPBOARD selection (X CLIPBOARD selection). When an X client changes data associated with the X CLIPBOARD selection, the preferred embodiments write the associated data to the PM CLIPBOARD. Similarly, when a PM client writes information to the PM CLIPBOARD, the preferred embodiments associate the written data with the X CLIPBOARD selection.

FIRST PREFERRED EMBODIMENT

Figure 3:
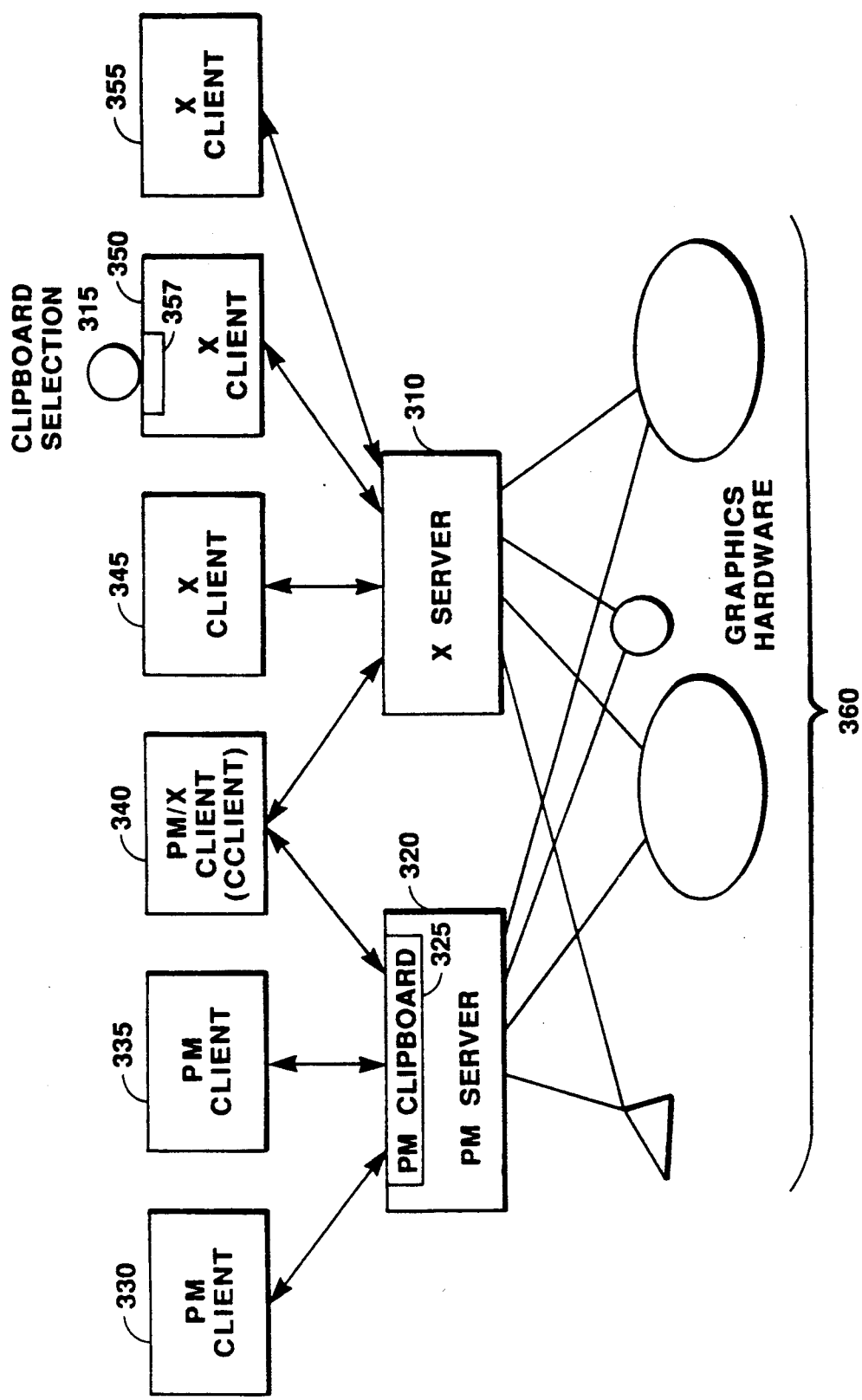
FIG. 3 is a multi-server system containing a communication client according to one preferred embodiment of the invention.

FIG. 3 is a diagram of a system in which a client named CCLIENT 340 is connected to both X server 310 and PM server 320. PM clients 330 and 335 are also connected to PM server 320 through which they communicate with graphics hardware 360. Similarly, X clients 345, 350 and 355 are connected to X server 310 through which they communicate with graphics hardware 360. PM server 320 provides an interclient communication facility, a PM CLIPBOARD 325, to PM clients 330-340, and X server 310 provides a interclient communication facility, an X CLIPBOARD selection 315, to X clients 340-355.

PM CLIPBOARD 325 is a communication data base that may be read from or written to by any of PM clients 330-340. X CLIPBOARD selection 315 might be visualized as a communication data base, but is actually a token representing control, or ownership, of a collection of data named "CLIPBOARD." X client 350, shown as controlling CLIPBOARD selection 315, may associate the contents of an internal data base 357 with the selection and transfer the contents of data base 357 to any X client requesting the contents of X CLIPBOARD selection 315. If X CLIPBOARD selection 315 were to be currently controlled by some other X client instead of X client 350, that other X client may associate a different data structure, having no relation to data base 357 in X client 350, with X CLIPBOARD selection 315.

The transfer of data from a window is typically called a "copy" when the window from which the data is acquired is not modified, and is called a "cut" when the window from which the data is acquired is modified to remove the transferred data. In the discussion that follows, both types of transfers will be referred to generically as a "copy." The transfer of data to a window is typically called a "paste."

Communication from the X Window system to the PM window system will now be described. CCLIENT 340, a process that follows both X protocol and PM protocol, functions as a well-behaved client of both an X server and a PM server. This means that CCLIENT 340 issues standard requests to both servers and accepts standard responses.

Figure 4:
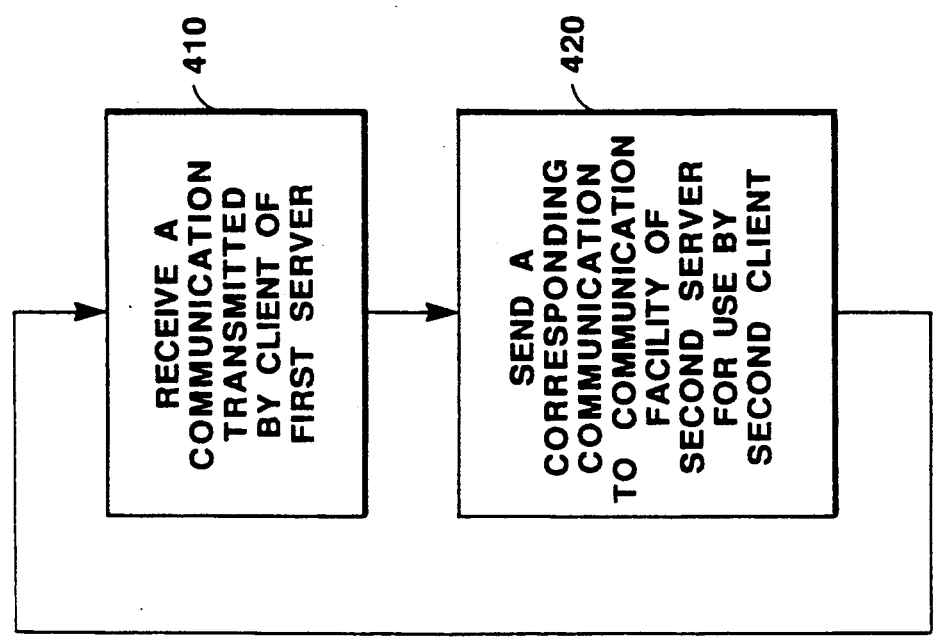
FIG. 4 is a general flow diagram of processing carried out by the preferred embodiments of the present invention.

This process allows a PM client such as PM client 330 to access data which an X client, such as X client 350, copies from a window. FIG. 4 shows an overview of the control flow of the process CCLIENT 340 follows to allow PM client 330 to access the copied data.

When X client 350 copies the data from a window in response to an external request, for example a user depressing a button on a mouse to select text to be copied, CCLIENT 340, acting as an X client, receives the associated data (step 410). Subsequently, CCLIENT 340, now acting as a PM client, sends the data to the interclient communication facility of the PM server (step 420).

Thus, communication between clients connected to different servers is achieved without requiring modification, or even knowledge, of the internal architecture of either server.

Figure 5:
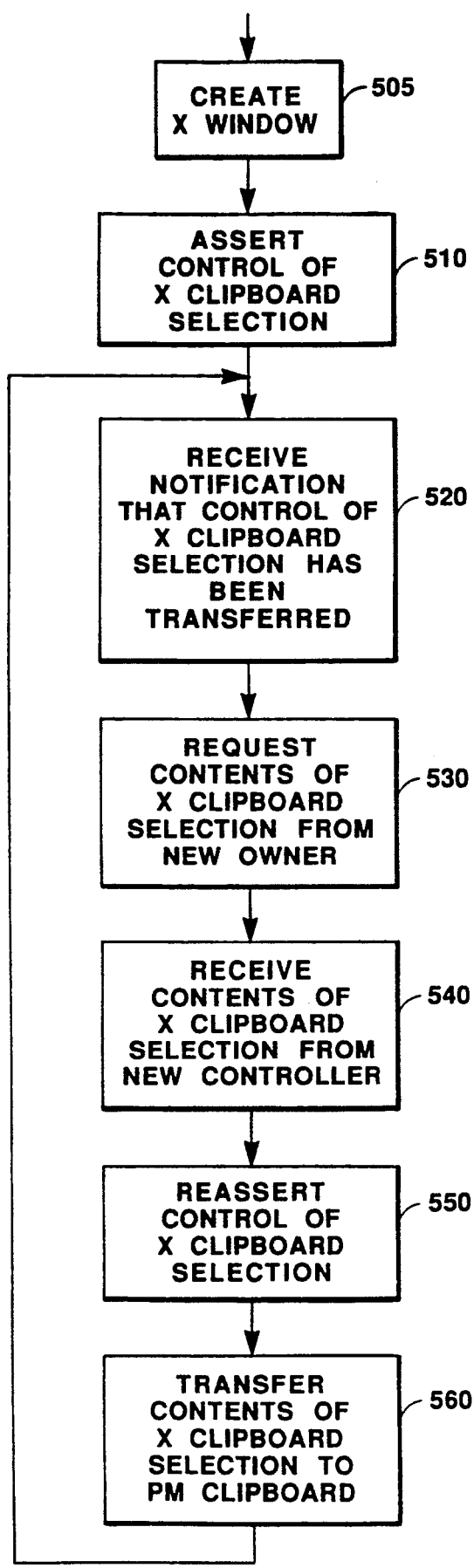
FIG. 5 is a more detailed flow diagram of the process shown in FIG. 4.

FIG. 5 shows the control flow outlined in FIG. 4 in more detail for the first preferred embodiment. To receive the data CCLIENT 340 first creates an X window for itself (step 505), and asserts control of the X CLIPBOARD selection by issuing a SetSelectionOwner request (step 510). This request ensures that CCLIENT 340 will receive notification when a conventional X client, such as X client 350, copies data from a window. A conventional X client copying data from a window will itself assert control of X CLIPBOARD selection 315, thereby causing X server 310 to send a SelectionClear event to CCLIENT 340. Thereafter, CCLIENT 340 behaves as a "clipboard client" as described in the inter-client communication conventions manual cited earlier. CCLIENT 340's behaving as a clipboard client means that, when another X client asserts control of X CLIPBOARD selection 315, CCLIENT 340 will reassert its own control by issuing another SetSelectionOwner request. As described later, this ensures that CCLIENT 340 will always be informed when another client changes X CLIPBOARD selection 315.

A copy of data from a window owned by an X client, followed by a paste of the data into a window owned by a PM client, will now be described to illustrate the process of steps 410-420. One way in which a user may select text in a window owned by an X client is by using the mouse to designate data to be copied. The user may then perform the copy by selecting an appropriate item in a data management menu for the window. When this occurs, a client owning the window, such as X Client 350 in FIG. 3, will assert control of X CLIPBOARD selection 315 by sending a SetSelectionOwner request to X server 310. In response to receiving the SetSelectionOwner request, X server 310 will send a SelectionClear event to CCLIENT 340 in accordance with the X protocol.

CCLIENT 340 then receives the SelectionClear event, thereby receiving notification that control has been transferred to another client and that CCLIENT 340 no longer has control (step 520). CCLIENT 340, in response to receiving the SelectionClear event, requests the contents of X CLIPBOARD selection 315 by issuing a ConvertSelection request (step 530). X server 310, in response to receiving the ConvertSelection request, will send a SelectionRequest event to X client 350. X client 350 responds to the SelectionRequest event by storing the data associated with the selection of an item of data, called a "property," on the window owned by CCLIENT 340 and in a format designated in the ConvertSelection request. Note that, because CCLIENT 340, being the controller of X CLIPBOARD selection 315, must respond to ConvertSelection requests instead of the X client that copied the data from a window, CCLIENT 340 must be able to deliver data in any format that might be designated in the ConvertSelection request. In order to deliver data in any format, CCLIENT 340 could ask X client 350 for the data in all known formats, one at format at a time. Alternatively, CCLIENT 340 itself could be equipped to perform the conversion to any known format upon receipt of a SelectionRequest event from X server 310, issued in response to a ConvertSelection request from another X client. X client 350 then issues a request causing X server 310 to send a SelectionNotify event to CCLIENT 340, thereby informing CCLIENT 340 that the data in the selection was converted in accordance with the ConvertSelection request issued by the CCLIENT 340.

CCLIENT 340 effectively receives the contents of the CLIPBOARD from X client 350 by receiving the SelectionNotify event and then issuing a GetProperty request to read the data (step 540).

CCLIENT 340 is now ready to send the data to the PM server communication facility. (See step 420 in FIG. 4). In response to receiving the SelectionNotify event, CCLIENT 340 reasserts control of X CLIPBOARD selection 315 by issuing a SetSelectionOwner request (step 550), and then transfers the contents of X CLIPBOARD selection 315 to PM CLIPBOARD 325 by opening PM CLIPBOARD 325 (i.e. calling PM WinOpenClipbrd), writing the data from the property into PM CLIPBOARD 325 (i.e. calling PM WinSetClipbrdData), and closing PM CLIPBOARD 325 (i.e. calling PM WinCloseClipbrd) (step 560).

In step 560, at least two versions of the data, a text version and a bitmap version, are written into PM CLIPBOARD 325. Translation of the data into the desired formats is performed by CCLIENT 340. Note that in FIG. 3, CCLIENT 340 has the ability to write data into PM CLIPBOARD 325, but X clients 345-355 do not because X clients 345-355 are not also PM clients.

The user may then paste data into a window owned by a PM client, such as PM client 330. PM client 330 will use its normal mechanisms to read from PM CLIPBOARD 325 to paste the data at a location specified by the user. Thereafter, CCLIENT 340 may go back to step 520.

Figure 6:
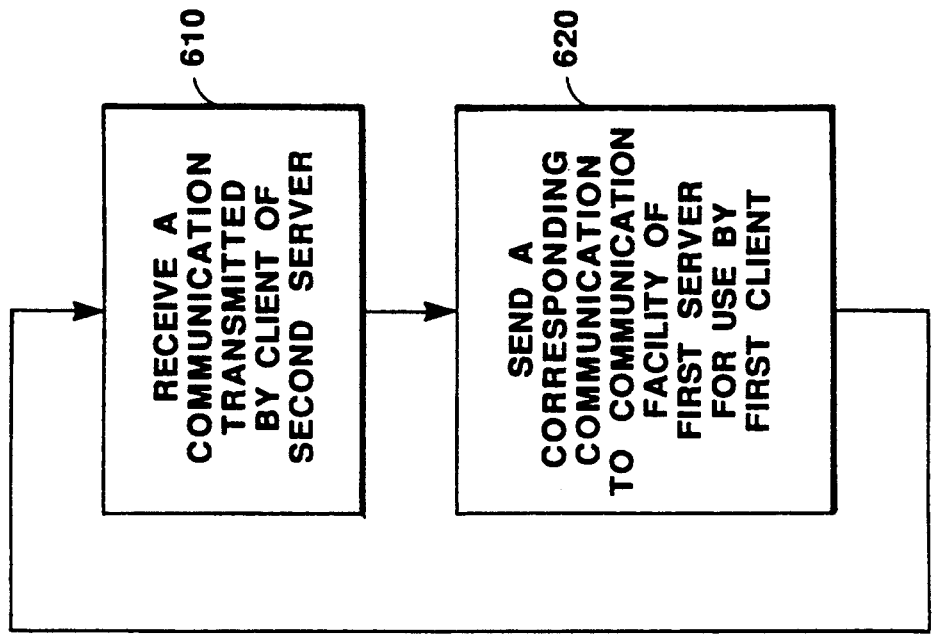
FIG. 6 is a general flow diagram of a variation of the processing carried out by the first preferred embodiment.

Communication from the PM Window system to the X Window system will now be described. When a client such as PM client 335 copies data from a window, it is desired that an X client, such as X client 350, be able to access the data. FIG. 6 shows an overview of the control flow that CCLIENT 340 follows to allow X client 350 to access the copied data. When PM client 335 copies the data from a window in response to, for example, a user selecting data with a mouse, CCLIENT 340 acting as an PM client receives the associated data (step 610). Subsequently, CCLIENT 340, acting as a X client, sends the data to the interclient communication facility of the X server (step 620).

Figure 7:
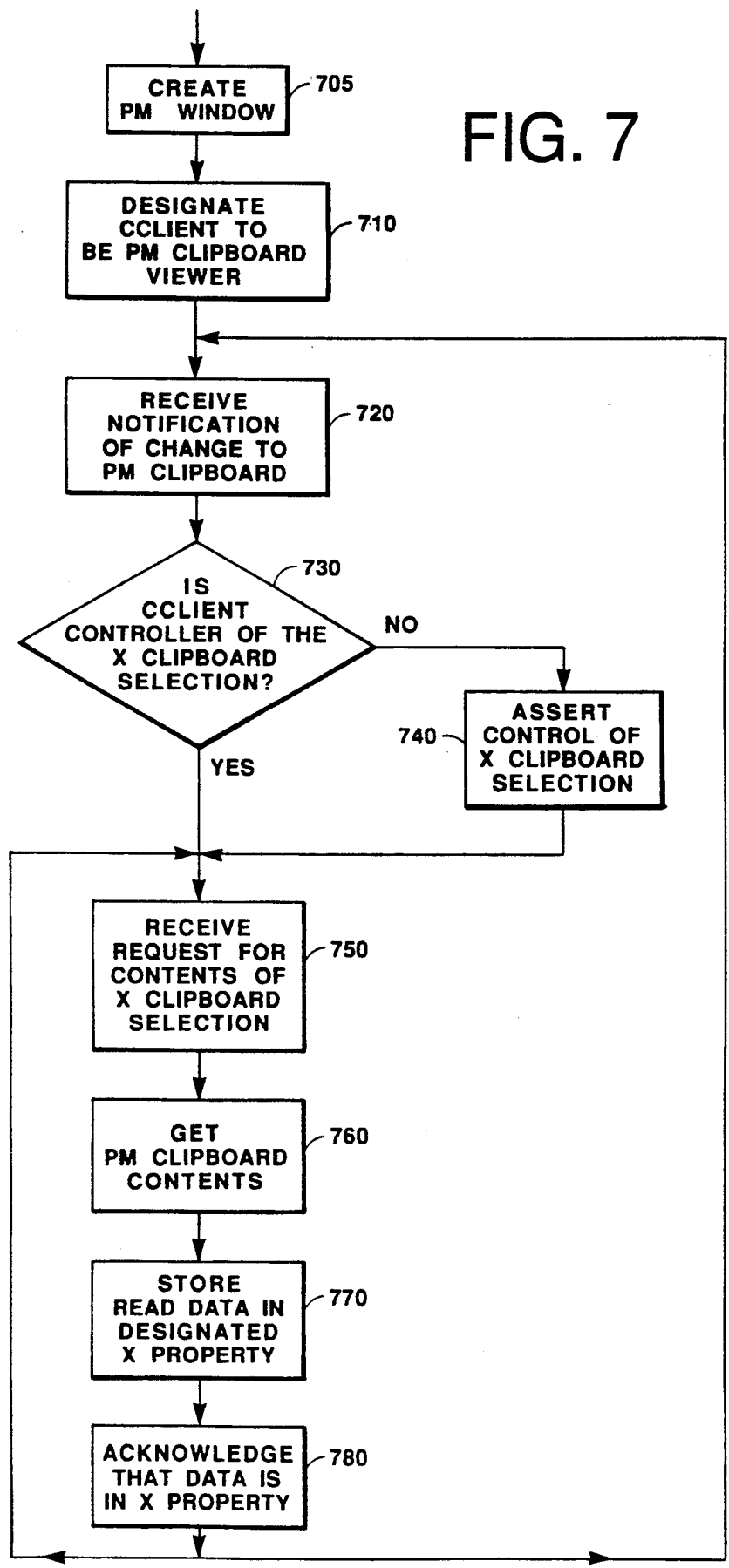
FIG. 7 is a more detailed diagram of the process shown in FIG. 6.

FIG. 7 shows the control flow outlined in FIG. 6 in more detail. First, CCLIENT 340 creates a PM window for itself (step 705), and issues a request to the PM server to make CCLIENT 340 the PM CLIPBOARD "viewer," which is a client that receives a PM event whenever the contents of PM CLIPBOARD 325 changes, by calling PM WinSetClipbrdViewer (step 710). By being the PM CLIPBOARD viewer, CCLIENT 340 is ensured of always being informed of changes to PM CLIPBOARD 325.

Because another PM client may request to be the PM CLIPBOARD viewer, which would cause CCLIENT 340 to lose its status as the CLIPBOARD viewer, CCLIENT 340 must be able to reacquire its status as the PM CLIPBOARD viewer. This problem can be addressed by relying on the other PM client to restore the previous viewer when it is finished. In addition, CCLIENT 340 could periodically monitor PM CLIPBOARD 325 by calling PM WinClipbrdViewer to determine whether there is another viewer.

A copy of data from a window owned by a PM client, followed by a paste of the data into a window owned by an X client, will now be described. This corresponds to step 720 in FIG. 7. The user may select data in a window owned by a PM client by, for example, using a mouse to select text to be copied. Alternatively, the user could select some other type of data, such as graphical data, to be copied. The user may then perform the copy by selecting an appropriate item in a data management menu for the window. When this occurs the client owning the window, such as PM Client 335, will open PM CLIPBOARD 325 and write the copied data into PM CLIPBOARD 325. In response to PM CLIPBOARD 325 being written, PM server 320 sends a WM_DRAWCLIPBOARD event to CCLIENT 340 because CCLIENT 340 is the designated CLIPBOARD viewer as described earlier.

CCLIENT 340 receives notification of the change to PM CLIPBOARD 325 by receiving the WM_DRAWCLIPBOARD event (step 720). In response to receiving the PM draw CLIPBOARD message, CCLIENT 340 should ensure that it is the controller of X CLIPBOARD selection 315 (step 730), and issue a SetSelectionOwner request to assert control of X CLIPBOARD selection 315 if it is not the current controller (step 740). The previous controller of X CLIPBOARD selection 315 is sent a SelectionClear event in accordance with the X protocol, and any X client may now paste the data associated with the selection. An X client wishing to paste the data associated with X CLIPBOARD selection 315 issues a ConvertSelection request to X server 310 which in turn generates a SelectionRequest event that is sent to CCLIENT 340.

CCLIENT 340 effectively receives the request for the contents of X CLIPBOARD selection 315 when it receives the SelectionRequest event (step 750). CCLIENT 340 then gets the contents of PM CLIPBOARD 325 by opening PM CLIPBOARD 325 (i.e. calling PM WinOpenClipbrd), reading the contents of PM CLIPBOARD 325 (i.e. calling PM WinQueryClipbrdData), and closing PM CLIPBOARD 325 (i.e. calling PM WinCloseClipbrd) (step 760). If the data is available from the CLIPBOARD in the requested format, or if it can be converted to the requested format by PM or CCLIENT 340, CCLIENT 340 writes the data as a property on a window as specified by X Client 350 in the ConvertSelection request (step 770). X server 310 issues a SelectionNotify event to X client 350 on behalf of CCLIENT 340 after CCLIENT 340 has attempted to convert the contents of the PM CLIPBOARD to the requested format and has attached the converted data to the designated property if the convert was successful. CCLIENT 340 reports the status of convert operation by issuing a SendEvent request for event type SelectionNotify to X server 310, thereby causing X server 310 to send a SelectionNotify event to X client 350. X client 350 may then read the property and paste the data at a location specified by the user.

Although in the configuration shown in FIG. 3 X server 310 is communicating with the same set of graphics hardware as PM server 320, X server 310 could be communicating with a different set of graphics hardware than PM server 320. In that case, it would be possible to copy data from a window generated on one set of graphics hardware and paste the data into a window generated on the other set of graphics hardware. It is more typical, however, for X server 310 to share a common set of graphics hardware with PM server 320. If the two servers are sharing a common set of graphics hardware, then some scheme should be implemented to ensure that the graphics hardware is efficiently allocated between the two servers.

Figure 8:
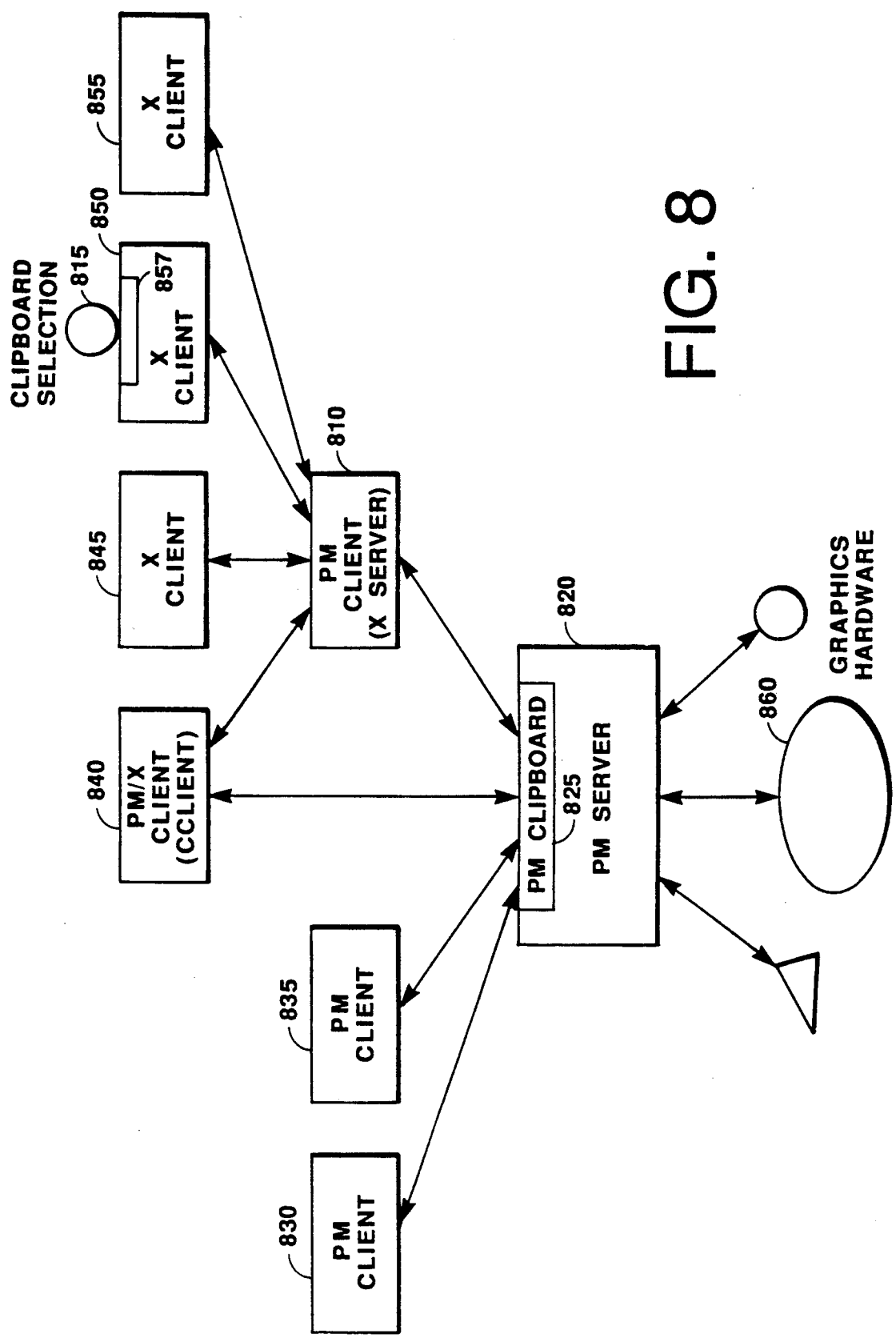
FIG. 8 is an alternative version of FIG. 3.

One way to allocate the graphics hardware efficiently between two servers is shown in FIG. 8. In FIG. 8, X server 810 is a PM client that translates between X protocol and PM protocol thereby allowing X clients 840-855 to communicate with graphics hardware 860. This implementation of X protocol in terms of PM protocol essentially allows X server 810 to share support technology (conventions, code, data structures, hardware access structures, etc.) with PM server 820, thereby allowing hardware resources to be efficiently allocated. This configuration is preferable to one involving low level integration of an X server with a PM server because, as explained above, such integration might entail major technological and legal problems.

In addition, although FIG. 8 shows a PM server as the server on which X server 810 is based, the base server is not restricted to be PM server. The base server could instead be any graphics server having sufficient functionality to support the protocol of the system being implemented, which is the X Window System in the first preferred embodiment.

One advantage of the first embodiment is that CCLIENT 840 can be implemented without modification to either X server 810 or PM server 820. Thus, commercially available versions of these servers might be used to implement the illustrated configurations.

SECOND PREFERRED EMBODIMENT

Figure 9:
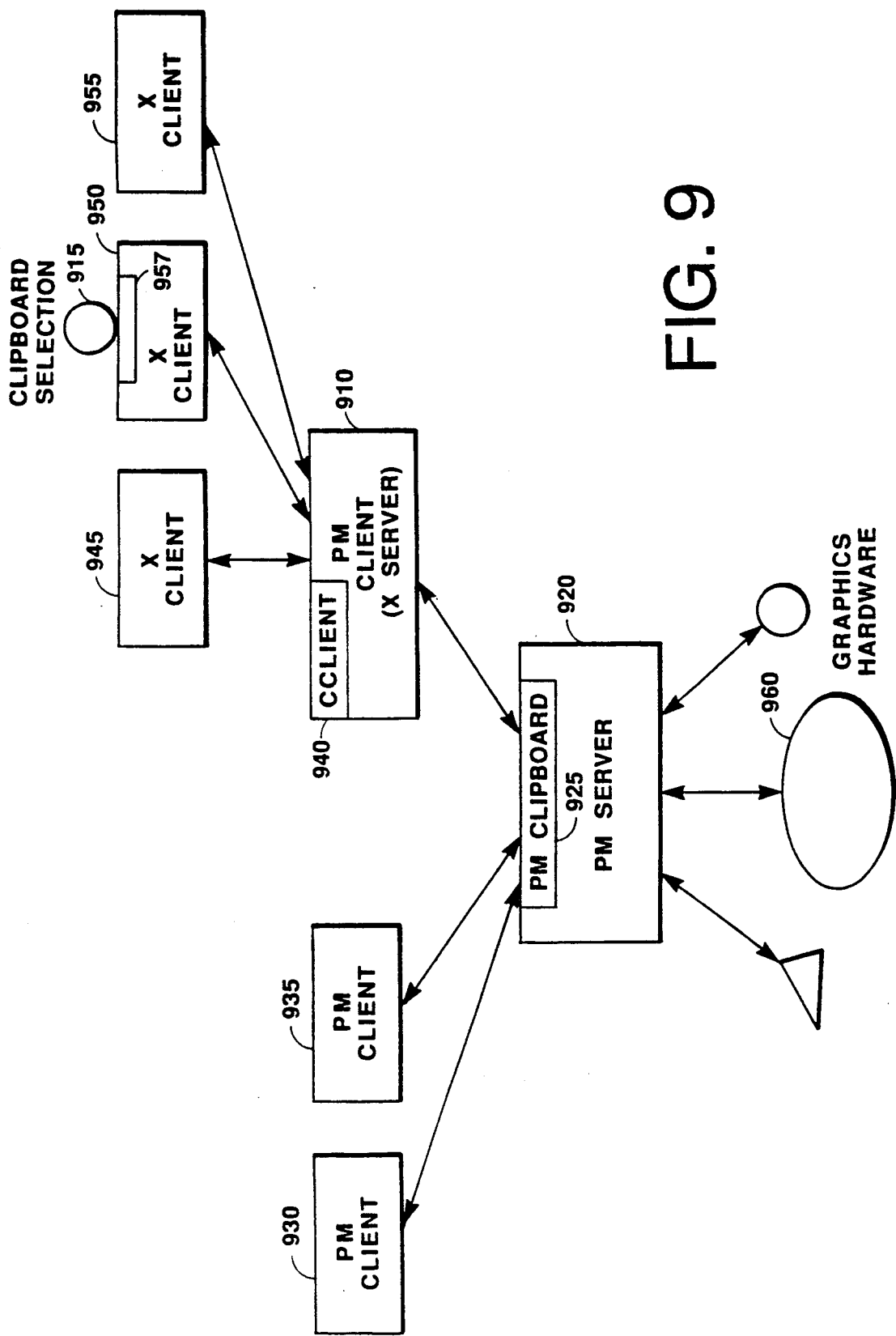
FIG. 9 is a diagram of a multi-server system containing emulated communication client according to a second preferred embodiment of the present invention.

FIG. 9 shows a second preferred embodiment of the present invention. FIG. 9 is similar to FIG. 8, except that the presence and functionality of a communication client (CCLIENT) 940 is emulated within X server 910. This emulation is invisible to X clients 945-955 which cannot detect whether they are running in a conventional X Window System or in an X Window System according to the second preferred embodiment of the present invention where CCLIENT 940 is emulated within the X server 910. X server 910 in this case supplies a virtual X client to the operating environment of X clients 945-955.

Although the sequence of requests issued by an emulated communication client could be the same as that of the first preferred embodiment, for simplicity of implementation, CCLIENT 940 issues a slightly different sequence of requests. These will be described below.

X server 910 containing CCLIENT 940 is a modified version of the X Window System sample server Version 11, Release 4, published by MIT. The modifications needed fall into two classes: (1) modifications needed to translate between X protocol and PM protocol and (2) modifications needed to emulate CCLIENT 940. Thus, X server 910 containing CCLIENT 940 differs from the X Window sample server in both data structure and control flow.

One of the modifications to translate between X protocol and PM protocol is to change the sample server device dependent layer (DDX) to contain calls to PM. In addition, since all PM clients require that the entry point be named MAIN, another modification to the X window sample server is to rename the entry point named MAIN to be XMAIN, and modify it. A new routine, MAIN, is written to initialize the PM environment, and then MAIN calls XMAIN. Initializing the PM environment includes a call to PM WinRegisterClass to register a PM window class. This PM call causes extra storage in the PM window data structure (PMREC) to be allocated for a pointer to a corresponding X WindowRec data structure. Because XMAIN may return when X server 910 closes down, MAIN closes down the PM environment after the call to XMAIN.

The implementation of X server 910 as a client of PM server 920 is not described in detail because it is believed that an acceptable implementation can be designed by persons or ordinary skill having knowledge of both servers. For example, other X servers that communicates with graphics hardware through a PM server have been designed, including XVision, a Microsoft Windows-based X server, marketed by Visionware Limited; and MacX, an Apple Macintosh-based X server. A method of implementing X server 910 such that the windowing interface of X clients are compatible with the windowing interface of PM clients is described in U.S. patent application Ser. No. 560,725 filed Jul. 31, 1990, whose contents are herein incorporated by reference.

Modifications to the sample server to emulate CCLIENT 940 will be discussed. Unless otherwise specified, routine names used in the discussion that follows refer to routines in the X window sample server version 11, Release 4, published by MIT. All OS/2 PM routine names are identified by "PM."

As stated earlier, from viewpoint of X clients, CCLIENT 940 must appear as a client connected to X server 910 possessing resources such as selections. To achieve this end, the status of CCLIENT 940 is represented in X server 910 with many of the same data structures used to represent other X clients. This representation is implemented with steps performed in the initialization section of the sample server where X server 910 allocates data for CCLIENT 940. Data initialization for CCLIENT 940 is performed after the "server client," which owns certain resources including the root window, is created and initialized.

Data initialization for CCLIENT 940 includes allocating a data structure (not shown) for CCLIENT 940 and placing the data structure at a predefined position in X server 910's client array. InitClientResources is called for CCLIENT 940 so that space is allocated in the client resources table for resources such as windows, fonts, pixmaps, and graphics contexts. A client counter (not shown) in X server 910 is increased by 1 to signify the existence of CCLIENT 940.

The sample server is further modified to send a SelectionClear event to CCLIENT 940 whenever another client asserts control of X CLIPBOARD selection 915, regardless of whether CCLIENT 940 was the controller of the selection before the other X client asserted control. With this further modification to the sample server, CCLIENT 940 need not behave as a CLIPBOARD client and constant assertion of control of the CLIPBOARD selection, as is done in steps 510 and 550 in the first preferred embodiment, is therefore not necessary.

Figure 10:
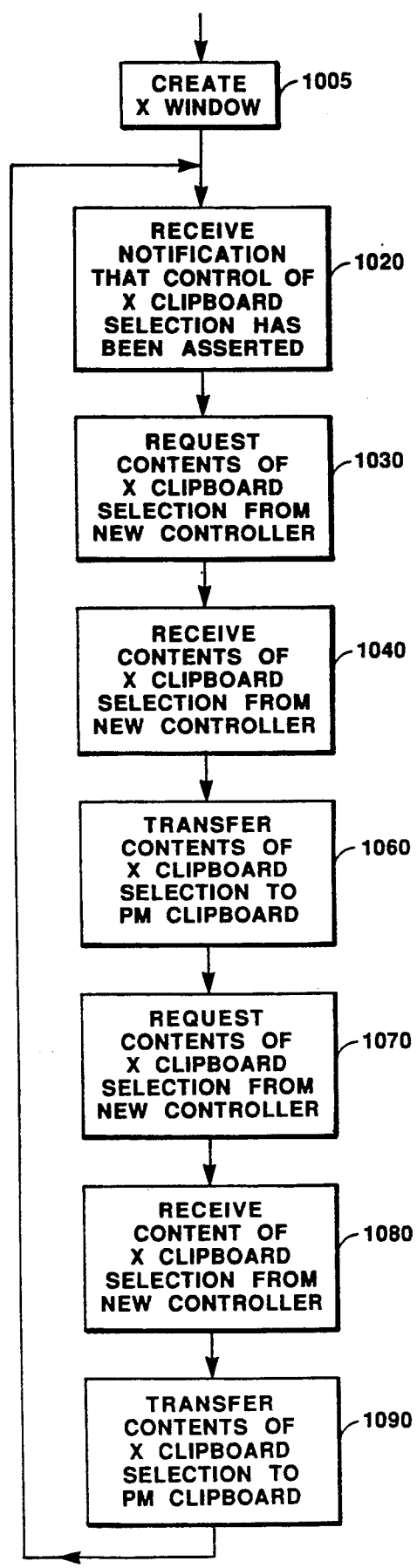
FIG. 10 is a flow diagram of processing carried out by the second preferred embodiment.

FIG. 10 shows the control flow outlined in FIG. 4 in more data 1 for the second preferred embodiment. To receive the data CCLIENT 940 first creates an X window for itself (step 1005).

A copy of data from a window owned by an X client, followed by a paste of the data into a window owned by a PM client, will now be described. As described earlier, a user may select data in a window owned by an X client by using the mouse to designate data to be copied, and then performing the copy by selecting an appropriate item in a data management menu for the window, thereby invoking the process of steps 410–420. When this occurs, a client owning the window, such as X Client 950 in FIG. 9, will assert control of X CLIPBOARD selection 915 by sending a SetSelectionOwner request to X server 910. In response to receiving the SetSelectionOwner request, X server 910 will send a SelectionClear event to CCLIENT 940, regardless of whether CCLIENT 940 was the previous controller of CLIPBOARD selection 915.

CCLIENT 940 then receives the SelectionClear event, thereby receiving notification that control has been asserted by a client (step 1020). CCLIENT 940, in response to receiving the SelectionClear event, requests the contents of X CLIPBOARD selection 915 in text format by issuing a ConvertSelection request (step 1030). X server 910, in response to receiving the ConvertSelection request, will send a SelectionRequest event to X client 950. X client 950 responds to the SelectionRequest event by storing the data associated with the selection in an item of data, called a "property," on the window owned by CCLIENT 940 in text format, provided that X client 950 is capable of converting the data to text format.

X client 950 then issues a SendEvent request causing X server 910 to send a SectionNotify event to CCLIENT 940, thereby informing CCLIENT 940 whether the data in the selection was converted in accordance with the ConvertSelection request issued by the CCLIENT 940.

CCLIENT 940 effectively receives the contents of X CLIPBOARD selection 915 from X client 950 by receiving the SelectionNotify event and issuing a GetProperty request to read the data (step 1040).

CCLIENT 940 is now ready to send the data to the PM server interclient communication facility. (See step 420 in FIG. 4). In response to receiving the contents of X CLIPBOARD selection 915, CCLIENT 940 transfers the contents of X CLIPBOARD selection 915 to PM CLIPBOARD 925 by opening PM CLIPBOARD 925 (i.e. calling PM WinOpenClipbrd), writing the data from the property into PM CLIPBOARD 925 (i.e. calling PM WinSetClipbrdData), and closing PM CLIPBOARD 925 (i.e. calling PM WinCloseClipbrd) (step 1060).

CCLIENT 940 then performs steps 1070, 1080, and 1090, which are similar to steps 1030, 1040, and 1060 respectively. Steps 1070, 1080, and 1090 request, receive, and transfer data in bitmap instead of text format. If CCLIENT 940 were to be modified to support another format for PM, another set of steps of requesting, receiving, and transferring would be added to support that other format.

The user may then paste data into a window owned by a PM client, such as PM client 930, and PM client 930 will use its normal mechanisms to read from PM CLIPBOARD 925 to paste the data at a location specified by the user. Thereafter, CCLIENT 940 may go to step 1020.

Although, as stated earlier, CCLIENT 940 appears to be a separate process from X server 910 when viewed outside of X server 910, in the second preferred embodiment, X server 910 and CCLIENT 940 share a common address space within a common process. In other words, CCLIENT 940 is preferably emulated in the same process in which other facilities of X server 910 are implemented.

Although CCLIENT 940 resides in the same address space as X server 910, CCLIENT 940 is still somewhat modular. There are two primary entry points into CCLIENT 940. The first entry point corresponds to X server 910 sending CCLIENT 940 an X event, and the second entry point corresponds to X server 910 sending CCLIENT 940 a PM event.

The first entry point is called from the sample server routine SendEventToClient when it is determined that the current event being generated is to be sent to CCLIENT 940.

The second entry point into CCLIENT 940 is called from the designated window procedure for the WM_DRAWCLIPBOARD event. The designated window procedure for the WM_DRAWCLIPBOARD event is called when X server 910, which is a PM client, receives the PM event WM_DRAWCLIPBOARD.

Once CCLIENT 940 is active because of entry from one of the two entry points, CCLIENT 940 effectively issues the same sequence of requests, and receives the same sequence of events as CCLIENT 340 of the first embodiment. The mechanism for issuing requests, however, is different from the mechanism used for a normal X client. For simplicity, it is desirable for CCLIENT 940 execute synchronously with X server 910, thereby avoiding race conditions and the reentry of one of the entry points before the return from a previous invocation of CCLIENT 940. When CCLIENT 940 wishes to issue an X request, it adds the request to X server 910's request queue. X server 910 dequeues request from the request queue synchronously in X server 910. Thus, request processing will not commence until CCLIENT 940 returns control to X server 910.

This mechanism of issuing a request by adding to the request queue works in the second preferred embodiment because all of the requests in this embodiment are "one way requests" that do not require processing of the requests by the X server before execution can continue in the client issuing the request. If, for some reason, the preferred embodiments were to be modified so that CCLIENT 940 were to issue a round trip request requiring that request processing complete in the X server before the client issuing the request can continue execution, some other mechanism must be used by CCLIENT 940 to issue the request. One such mechanism might be to call a high level routine in the sample server for the associated request.

The issuance of PM requests by CCLIENT 940 is more straightforward than the issuing of X requests, as CCLIENT 940 is effectively a real PM client in the same address space as X server 910.

In order to receive an event, CCLIENT 940 executes a RETURN instruction in order to return control to X server 910.

Thus, it can be seen that the second preferred embodiment has the functionality of the first preferred embodiment without having an actual X client to act as a communication client. One advantage of the second preferred embodiment is that the correct communication client for the host system will always be running since the communication client is bound to the server that is a client of the host system. Thus, no process need be concerned about starting the correct communication client, which could be awkward because such a process may be on a different network node than the host server, which in this case is PM server 920.

Another advantage of the second preferred embodiment is that, because control of the CLIPBOARD selection remains with the X client that copied data from a window, that X client will respond to ConvertSelection requests, and CCLIENT 340 need not have the capability to convert to any format that might be designated in the ConvertSelection request.

To achieve certain efficiencies, the code implementing CCLIENT 940 could be intertwined with the code implementing the other portions of X server 910. In other words, CCLIENT 940 could be a procedure composed of a first set of interrelated computer instructions, and the part of X server 910 responsible for executing graphics operation requests could be a second procedure composed of a second set of interrelated computer instructions interspersed with the computer instructions of CCLIENT 940. Because the two sets of computer instructions would be interspersed, execution of the two procedures would be interleaved. The CCLIENT 940 event handling procedure, in emulating a communication client's handling of an event, may submit its own requests to X server 910 by calling the appropriate X server 910 request processing routine directly. Conditional statements that change the execution flow when the current request is from CCLIENT 940 could be dispersed throughout the server. This would be needed because there are various points in the server where it would be appropriate to respond to a request as if it had come from a normal client.

THIRD PREFERRED EMBODIMENT

Figure 11:
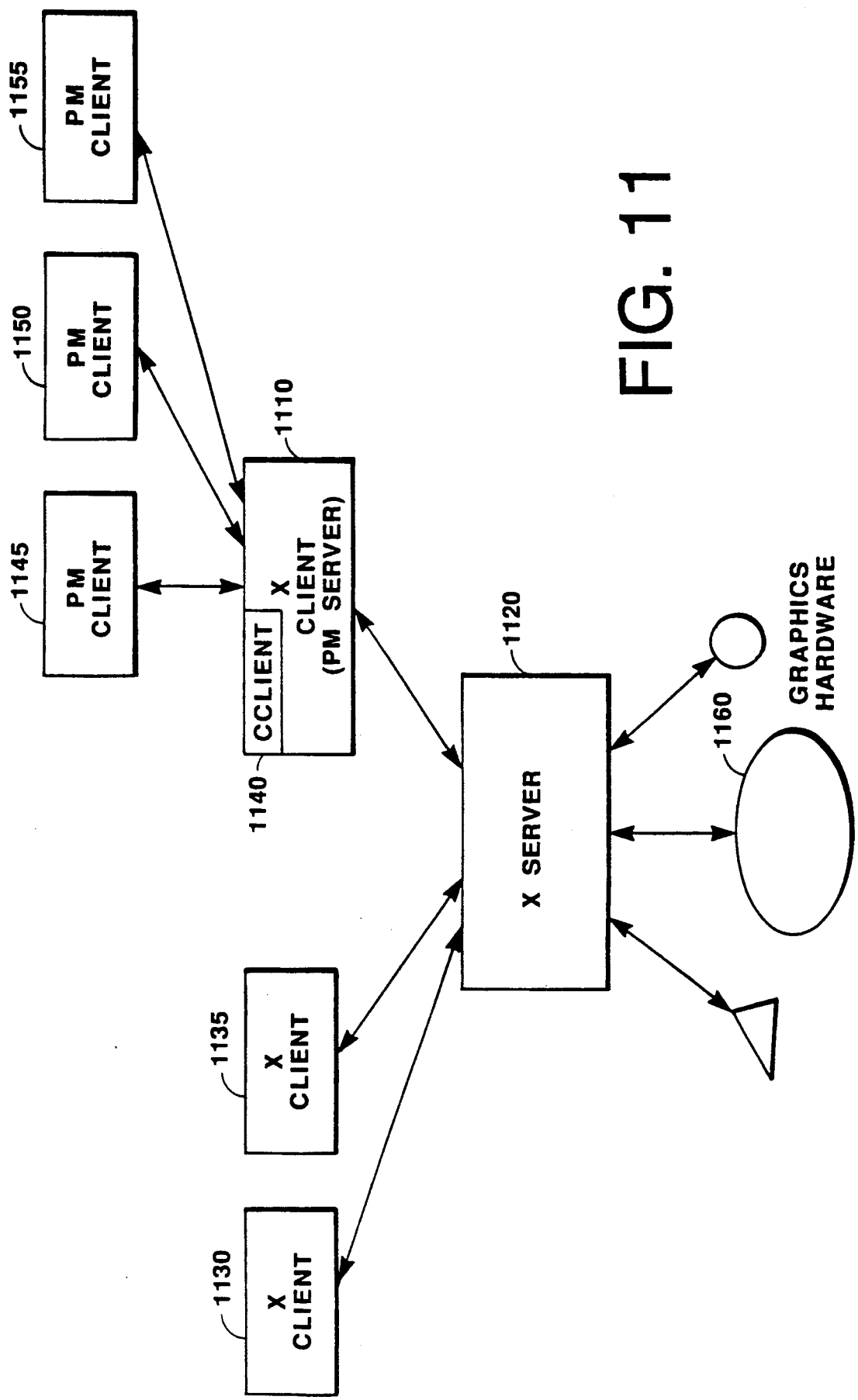
FIG. 11 is a diagram of a multiserver system containing an emulated communication client according to a third embodiment of the present invention.

FIG. 11 shows a system containing CCLIENT 1140 according to a third embodiment of the invention. In FIG. 11, X client 1110 is a PM server that operates by translating between PM protocol and X protocol. X clients 1130, 1135 and 1140 communicate with graphics hardware 1160 through X server 1120. PM clients 1145, 1150 and 1155 communicate with graphics hardware 1160 through PM server 1110, which is an X client. Thus, the dependency of the servers in the third embodiment is the inverse of that of the second embodiment, and as such has the advantages of shared support technology as explained in connection with the second embodiment above.

CONCLUSION

With the preferred embodiments of the present invention, communication clients may act as agents for clients connected to different display servers. When a client connected to one server issues a communication, the communication client acting as a client of the server to which the communication issuing client is connected receives the communication and then, acting as a client of a different server, transmits the communication to the communication facility of the different server. The communication client communicates with the various servers using relatively high-level mechanisms such as client protocols or high-level routine calls. Modification, or knowledge, of the low-level architecture of the servers is not required.

Additional advantages and modifications will readily occur to those skilled in the art. The invention in its broader aspects is therefore not limited to the specific details, representative apparatus, and illustrative examples shown and described.

For example, the selection used to communicate between servers is not limited to the CLIPBOARD selection, and other selections, such as a selection named "PRIMARY", might be used as new conventions are defined and supported. In addition, because the invention may be practiced without an X server, selections are not necessarily used to communicate between servers, as the communication mechanism of the particular type of server would be used.

Thus, it will be apparent to those skilled in the art that various modifications and variations can be made to the instant invention without departing from the scope or spirit of the invention, and it is intended that the present invention cover the modifications and variations provided they come within the scope of the appended claims and their equivalents.

What is claimed is:

1. In a computer system having a display server connected to a first server and a second server, said first server with a first communications facility for providing communication between clients of the first server, and said second server with a second communication facility for providing communication between clients of the second server, a method of operating said display server, comprising the steps of:
   providing a shared communication client of both the first and second servers;
   receiving, by the shared communication client, a first communication transmitted by the first client to the first communication facility of the first server;
   sending, to the second communication facility of the second server, a notification for the second client of the first communication from the first client;
   detecting said notification by said display server to confirm that said second client has received said first communication from said first client;
   the first server having a first communication data base which may be controlled at each instance by only one of the clients of the first server, and the method further includes the steps of
   taking control of the first communication data base by the shared communication client, and wherein the step of receiving the first communication transmitted by the first client includes the substeps of
   receiving a first server event indicating that the first client has taken control of the first communication data base and that the shared communication client no longer has control;

requesting, in response to the receipt of the first server event, the contents of the first communication data base from the first client;

receiving from the first client, after the request of the contents of the first communication data base, the contents of the first communication data base; and recovering control of the first communication data base by the shared communication client.

2. A method according to claim 1, wherein the second server has a second communication data base for which one of the clients of the second server may be sent an event when the contents of the second communication data base changes, wherein the method further includes the step of designating the shared communication client as the client of the second server to be sent an event when the contents of the second communication data base changes; and wherein the step of receiving notification of the second communication transmitted by the second client includes the substep of receiving a second server event indicating that the second client has changed the second communication data base.

3. A method according to claim 1, wherein the second server has a second communication data base, and wherein the step of sending notification of the first communication transmitted by the first client includes the substeps of writing data into the second communication data base in accordance with the contents of the first communication data base received from the first client.

4. A method according to claim 3, wherein the step of sending notification of the second communication transmitted by the second client includes the substeps of receiving a first server event originating from the first client requesting the contents of the first communication data base; and sending the contents of the first communication data base to the first client.

5. A method according to claim 3, wherein the step of ending notification of the second communication transmitted by the second client includes the substeps of receiving an first server event originating from the first client requesting that the contents of the first communication data base be stored in a buffer accessible to the first client;

storing, in response to the receipt of the first server event, the contents of the first communication data base in the buffer;

sending a request to the first server to notify the first client of the completion of the storage of the first communication data base contents in the buffer.

6. A method according to either of claims 1 or 2, further including the steps, performed by the first server, of emulating the shared communication client in a process in which the facilities of the first server are implemented;

sending the emulated shared communication client a first server vent by calling a first entry point of the shared communication client.

7. The method according to either of claims 1 or 2, further including the steps, performed by the first server, of: generating a first server event in response to a change in the status of the first server;

determining a set of clients to receive the first server event; and calling, in response to receiving a first server event, a first entry point to emulate the shared communication client if the shared communication client is a member of the set of determined clients.

8. A method according to either of claims 1 or 2, wherein the second server provides centralized graphics functions to the second server clients through a second server protocol and wherein the method further includes the steps, performed by the first server, of:

providing centralized graphics functions to first server clients through a first protocol including the substep of executing the protocol of the second server to function as one of the clients of the second server;

emulating the shared communication client in a process in which the graphics functions provided by the first server are implemented;

sending the emulated shared communication client a first server event by passing control to a first entry point; and sending the emulated shared communication client a second server event by passing control to a second entry point to the shared communication client.

9. A method according to claim 8, further including the step, performed by the emulated shared communication client, of receiving an event by returning control to the first server.

10. A method according to either of claims 1 or 2, wherein the first server provides centralized graphics functions to the first server clients through a first server protocol, and further including the steps, performed by the second server, of providing centralized graphics functions to second server clients through a second protocol including the substep of executing the protocol of the first server to function as one of the clients of the first server;

emulating the shared communication client in a process in which the graphics functions provided by the second server are implemented;

sending the shared communication client a first server event by setting the execution path to a first entry point to the shared communication client; and sending the shared communication client a second server event by setting the execution path to a second entry point to the shared communication client.

11. A method according to claim 10, further including the step, performed by the emulated shared communication client, of receiving an event by returning control to the second server.

12. In a computer system having a display server connected to a first server and a second server, said first server with a first communications facility for providing communication between clients of the first server, and said second server with a second communication facility for providing communication between clients of the second server, a method of operating said display server, comprising the steps of:

providing a shared communication client of both the first and second servers;

receiving, by the shared communication client, a first communication transmitted by the first client to the first communication facility of the first server;

sending, to the second communication facility of the second server, a notification for the second client of the first communication from the first client;

detecting said notification by said display server to confirm that said second client has received said first communication from said first client;

the first server having a first communication data base which may be controlled at each instance by only one of the clients of the first server, and the wherein the method further includes the steps, performed by the first server, of emulating the shared communication client in a process in which the facilities of the first server are implemented; and sending a first server event to the shared communication client by calling a first entry point to the shared communication client, thereby indicating that the first client has asserted control of the first communication data base, and wherein the method further includes the steps, performed by the shared communication client, of receiving the first server event indicating that the first client has asserted control of the first communication data base;

requesting, in response to the receipt of the first server sent, the contents of the first communication data base from the first client; and receiving from the first client, after the request of the contents of the first communication data base, the contents of the first communication data base.

13. A method according to claim 12, wherein the second server has a second communication data base for which one of the clients of the second server may be sent an event when the contents of the second communication data base changes, wherein the method further includes the step, performed by the shared communication client, of designating the shared communication client as the client of the second server to be sent an event when the contents of the second communication data base changes, and wherein the step of receiving notification of the second communication transmitted by the second client includes the substep of receiving a second server event indicating that the second client has changed the second communication data base.

14. The method according to either of claims 12 or 13, further including the steps, performed by the first server, of generating a first server event in response to a change in the status of the first server;

determining a set of clients to receive the first server event; and calling, in response to the receiving step, a first entry point to emulate the shared communication client if the shared communication client is a member of the set of determined clients.

15. A method according to either of claims 12 or 13, wherein the second server provides centralized graphics functions the second server clients through a second server protocol, and wherein the method further includes the steps, performed by the first server, of providing centralized graphics functions to first server clients through a first protocol including the substep of executing the protocol of the second server to function as one of the clients of the second server;

emulating the shared communication client in a process in which the graphics functions provided by the first server are implemented;

sending the emulated shared communication client a first server event by passing control to a first entry point; and sending the emulated shared communication client a second server event by passing control to a second entry point to the shared communication client.

16. A method according to claim 15, further including the step, performed by the emulated shared communication client, of receiving an event by returning control to the first server.

17. A method according to either of claims 12 or 13, wherein the first server provides centralized graphics functions to the first server clients through a first server protocol, and further including the steps, performed by the second server, of:

providing centralized graphics functions to second server clients through a second protocol including the substep of executing the protocol of the first server to function as one of the clients of the first server;

emulating the shared communication client in a process in which the graphics functions provided by the second server are implemented;

sending the shared communication client a first server event by setting the execution path to a first entry point to the shared communication point; and sending the emulated shared communication client a second server event by setting the execution path to a second entry point to the shared communication client.

18. A method according to claim 17, further including the step, performed by the emulated shared communication client, of receiving an event by returning control to the second server.

19. The method according to either of claims 1 or 2, further including the step of providing graphics wherein the step of providing graphics functions includes the substeps of receiving a request for a graphics operation from the selected first server client, and executing the graphics operation request; wherein an emulation of the shared communication client is interleaved with the performance of the step of the execution of the graphics operation request.

20. A computer system for providing communication mechanisms to clients comprising:

a display server;

a first server processor, connected to said display server, for responding to communication operations requests generated by a first one of the clients of the first server processor, the first server processor including a first communication facility for communicating between clients of the first server;

a second server processor, connected to said display server, for responding to the communication operations requests generated by a second one of the clients of the second server processor, the second server processor including a second communication facility for communication between clients of the second server; and a shared communication client, coupled to the first server processor as a client and to the second server processor as a client, including means for receiving a first communication transmitted by the first client to the first communication facility of the first server; and means, coupled to the receiving means, for sending to the second communication facility of the second server a notification for the second client of the first communication from the first client; and means to detect in said display server said notification to confirm receipt of said notification from said first server to said second server;

wherein the first server processor includes a first communication data base which may be controlled at each instance by only one of the clients of the first server processor, wherein the shared communication client further includes means for taking control of the first communication data base by the shared communication client, and wherein the means for receiving the first communication transmitted by the first client includes means for receiving a first server processor event indicating that the first client has taken control of the first communication data base and that the shared communication client no longer has control;

means for requesting, responsive to the means for receiving the first server processor event, the contents of the first communication data base from the first client;

means for receiving from the first client, after the request of the contents of the first communication data base, the contents of the first communication data base; and means for recovering control of the first communication data bases by the shared communication client.

21. A system according to claim 20, wherein the second server processor includes a second communication data base for which one of the clients of the second server processor may be sent an event when the contents of the second communication data base changes, wherein the shared communication client further includes means for designating the shared communication client as the client of the second server processor to be sent an event when the contents of the second communication data base changes, and wherein the means for receiving notification of the second communication transmitted by the second client includes means for receiving a second server processor event indicating that the second client has changed the second communication data base.

22. A system according to claim 20, wherein the second server processor includes a second communication data base, and wherein the means for sending notification of the first communication transmitted by the first client includes means for writing data into the second communication data base in accordance with the contents of the first communication data base received from the first client.

23. A system according to claim 22, wherein the means for sending notification of the second communication transmitted by the second client includes means for receiving a first server processor event originating from the first client requesting the contents of the first communication data base; and means for sending the contents of the first communication data base to the first client.

24. A system according to claim 22, wherein the means for sending notification of the second communication transmitted by the second client includes means for receiving an first server processor event originating from the first client requesting that the contents of the first communication data base be stored in a buffer accessible to the first client;

means, responsive to the means for receiving the first server processor event, for storing the contents of the first communication data base in the buffer;

means for sending a request to the first server processor to notify the first client of the completion of the storage of the first communication data base contents in the buffer.

25. A system according to either of claims 20 or 21, wherein the first server processor includes means for emulating the shared communication client in a process in which other facilities of the first server processor are implemented; and means for sending the emulated shared communication client a first server processor event by calling a first entry point of the shared communication client.

26. The system according to either of claims 20 or 21, wherein the first server processor includes means for generating a first server processor event in response to a change in the status of the first server processor;

means for determining a set of clients to receive the first server processor event; and means for calling, responsive to the means for determining, first entry point to emulate the shared communication client if the shared communication client is a member of the set of determined clients.

27. A system according to either of claims 20 or 21, wherein the second server processor includes means for providing centralized graphics functions to the second server processor clients through a second server processor protocol including means for providing centralized graphics functions to first server processor clients through a first protocol including means for executing the protocol of the second server processor to function as one of the clients of the second server processor;

means for emulating the shared communication client in a process in; which the graphics functions provided by the first server processor are implemented;

means for sending the emulated shared communication client a first server processor event by passing control to a first entry point; and means for sending the emulated shared communication client a second server processor event by passing control to a second entry point of the shared communication client.

28. A system according to claim 27, wherein the emulated shared communication client further includes means for receiving an event by returning control to the first server processor.

29. A system according to either of claims 20 or 21, wherein the first server processor includes means for providing centralized graphics functions to the first server processor clients through a first server processor protocol, and wherein the second server processor further includes means for providing centralized graphics functions to the second server processor clients through a second protocol include; and means for executing the protocol of the first server processor to function as one of the clients of the first server processor;

means for emulating the shared communication client in a process in; which the graphics functions provided by the second server processor are implemented;

means for sending the shared communication client a first server processor event by setting the execution path to a first entry point to the shared communication client; and means for sending the shared communication client a second server processor event by setting the execution path to a second entry point to the shared communication client.

30. A system according to claim 29, wherein the emulated shared communication client further includes means for receiving an event by returning control to the second server processor.

31. A computer system for providing communication mechanisms to clients comprising:

a display server;

a first server processor, connected to said display server, for responding to communication operations requests generated by a first one of the clients of the first server processor, the first server processor including a first communication facility for communicating between clients of the first server;

a second server processor, connected to said display server, for responding to the communication operations requests generated by a second one of the clients of the second server processor, the second server processor including a second communication facility for communication between clients of the second server; and a shared communication client, coupled to the first server processor as a client and to the second server processor as a client, including means for receiving a first communication transmitted by the first client to the first communication facility of the first server; and means, coupled to the receiving means, for sending to the second communication facility of the second server a notification for the second client of the first communication from the first client;

means to detect in said display server said notification to confirm receipt of said notification from said first server to said second server;

the first server processor including:

a first communication data base which may be controlled at each instance by only one of the clients of the first server processor, and the first server processor further includes means for emulating the shared communication client in a process in which other facilities of the first server processor are implemented;

means for sending a first server processor event to the shared communication client, by calling a first entry point to the shared communication client, indicating that the first client has asserted control of the first communication data base, and the shared communication client further includes means for receiving a first server processor event indicating that the first client has asserted control of the first communication data base;

means for requesting, responsive to the means for receiving the first server processor event, the contents of the first communication data base from the first client; and means for receiving from the first client, after the request of the contents of the first communication data base, the contents of the first communication data base.

32. A system according to claim 31, wherein the second server processor includes a second communication data base for which one of the clients of the second server processor may be sent an event when the contents of the second communication data base changes, wherein the shared communication client further includes means for designating the shared communication client as the client of the second server processor to be sent an event when the contents of the second communication data base changes, and wherein the means for receiving notification of the second communication transmitted by the second client includes means for receiving a second server processor event indicating that the second client has changed the second communication data base.

33. The system according to either of claims 31 or 32, wherein the first server processor further includes means for generating a first server processor event in response to a change in the status of the first server processor;

means for determining a set of clients to receive the first ever processor event; and means for calling, responsive to the means for determining, first entry point to emulate the shared communication client if the shared communication client is a member of the set of determined clients.

34. A system according to either of claims 31 or 32, wherein the second server processor includes means for providing centralized graphics functions to the second server processor clients through a second server processor protocol, and wherein the first server processor further includes means for providing centralized graphics functions to first server processor clients through a first protocol including means for executing the protocol of the second server processor to function as one of the clients of the second server processor;

means for emulating the shared communication client in a process in; which the graphics functions provided by the first server processor are implemented;

means for sending the emulated shared communication client a first server processor event by passing control to a first entry point; and means for sending the emulated shared communication client a second server processor event by passing control to a second entry point of the shared communication client.

35. A system according to claim 34, wherein the emulated shared communication client further includes means for receiving an event by returning control to the first server processor.

36. A system according to either of claims 31 or 32, wherein the first server processor includes means for providing centralized graphics functions to the first server processor clients through a first server processor protocol, and wherein the second server processor further includes means for providing centralized graphics functions to the second server processor clients through a second protocol including means for executing the protocol of the first server processor to function as one of the clients of the first server processor;

means for emulating the shared communication client in a process in which the graphics functions provided by the second server processor are implemented;

means for sending the shared communication client a first server processor event by setting the execution path to a first entry point to the shared communication client; and means for sending the shared communication client a second server processor event by setting the execution path to a second entry point to the shared communication client.

37. A system according to claim 36, wherein the emulated shared communication client further includes means for receiving an event by returning control to the second server processor.

38. The system according to either of claims 20 or 21, further including means for providing graphics functions to a selected one of the first server processor clients including a first procedure composed of a first set of interrelated computer instructions;

wherein a means for emulating a shared communication client includes a second procedure composed of a second set of interrelated computer instructions interspersed with the first set of computer instructions.

* * * * *